Nov. 20, 1928.

J. F. LAMB ET AL 1,692,781

ELECTRIC HEATING DEVICE

Filed Oct. 20, 1925

Inventor
Joseph F. Lamb
Joseph Frederick Smart
By T. Clay Lindsey
Their Attorney Patented Nov. 20, 1928.

1,692,781

UNITED STATES PATENT OFFICE.

JOSEPH F. LAMB AND JOSEPH FREDERICK SMART, OF NEW BRITAIN, CONNECTICUT, ASSIGNORS TO LANDERS, FRARY & CLARK, OF NEW BRITAIN, CONNECTICUT, A CORPORATION OF CONNECTICUT.

ELECTRIC HEATING DEVICE.

Application filed October 20, 1925. Serial No. 63,755.

This invention relates to electrically heated utensils, such, for instance, as percolators or urns, and has as its aim to provide a heating device for utensils of this sort having various features of novelty and advantage.

The object of the invention is to provide a simple and effective electric heater of such shape and construction that it may be mounted in relatively narrow waist-like or reduced portions of percolators and the like, thus permitting such utensils to be made of a variety of shapes along slender and graceful lines.

A further object is to provide a heater, having the foregoing and other novel characteristics, with a protective device so arranged that it will operate with great nicety to break the current through the heater when a predetermined temperature is reached, as, for example, when the liquid within the percolator becomes almost depleted, and just before the percolator reaches a temperature at which the finish is likely to be damaged or the solder holding the parts together becomes melted.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings, wherein we have shown, by way of exemplification, one form or embodiment which the invention may take;

Figure 1:
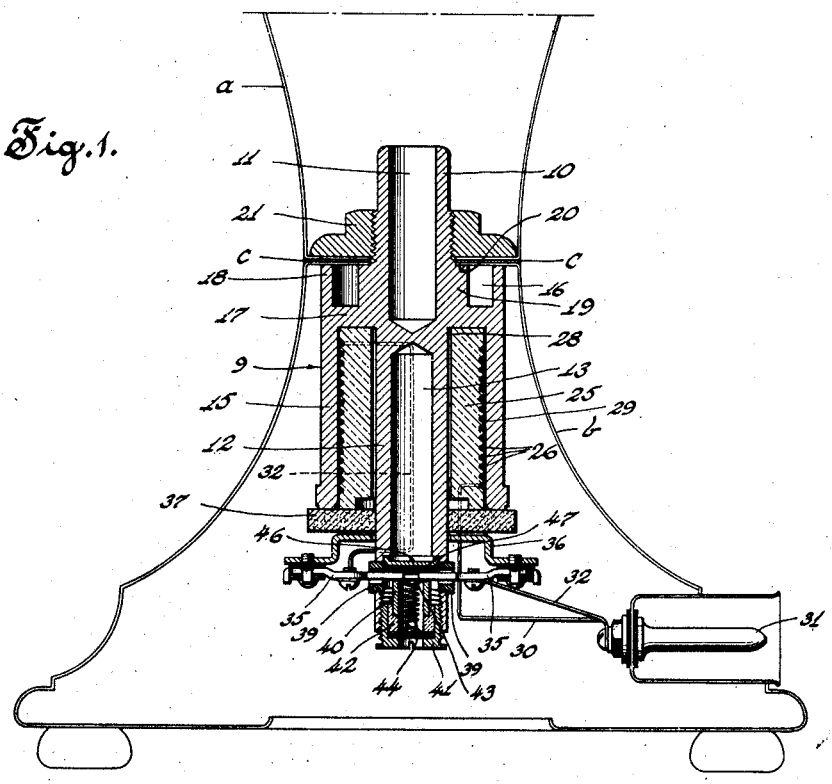
Figure 1 is a view taken centrally and vertically through a percolator in which the features of the present invention are incorporated, this view being taken on line 1—1 of Fig. 3.
Figure 2:
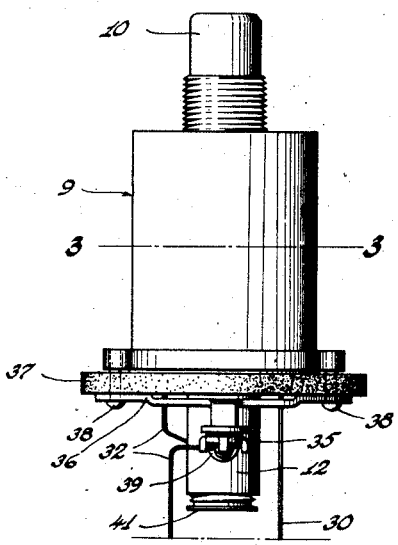
Fig. 2 is a side elevation of the heater.

Referring to the drawings in detail, $a$ denotes a vessel or receptacle such, for example, as the bowl of a percolator; and $b$ is a base on which the bowl is positioned. The bowl and base may, of course, be of any suitable construction. In Fig. 1, the lower portion of the bowl and the upper portion of the base are shown as being generally circular in form and of small diameter so that the percolator has a relatively narrow, slender waist-like portion resulting in a utensil of grace and pleasing appearance. The base and vessel may be united by solder $c$ or the like.

In the present illustrative disclosure of our invention, the heater is shown as having an integral part preferably formed of a single casting of generally circular shape and of such diameter as to fit within the upper portion of the base. This part has between its ends a body portion 9 from which projects upwardly a tubular extension 10 having a well or cavity 11 which constitutes the vaporizing chamber. This well extends down into and through the body portion. Depending from the body portion and, by preference, in axial alinement with the tubular extension 10 is a second tubular extension 12 which may be provided with an axial bore or recess 13 terminating just short of the lower end of the well 11. Depending from the body portion and surrounding the extension 12 is a cylindrical shell or skirt 15 between which and the extension 12 the heating unit is adapted to be positioned. The upper face of the body portion is provided with an annular groove 16 so that the body portion has a web portion 17, an annular upstanding lip or flange 18, and a boss 19. This boss has a shoulder 20, and this shoulder and the upper edge of the flange 18 are adapted to abut against the top of the base. The top of the base and the bottom of the vessel are clamped between the shoulder 20 and the flange 18 on one side and a nut 21 on the other side, this nut being screwed onto the tubular extension 11 as illustrated in the drawings.

Figure 3:
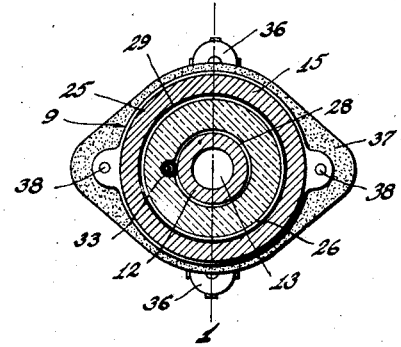
Fig. 3 is a sectional view taken on line 3—3 of Fig. 2.

The heating unit includes a bushing or core 25 of suitable electrical insulating material, such as lava, and an electric resistance wire 26 spirally wound about the external periphery of the core, the core having a spiral groove to receive the wire. The electrical heating unit is positioned within the chamber or space between the depending tubular extension 12 and the skirt 15, there being interposed between the heater and the skirt a sheet or sheets 29 of mica or the like which prevents short circuiting of the heating element by the skirt while, at the same time, the element is in intimate heat conducting relation with the skirt. It will be seen, particularly from Figs. 1 and 3, that the internal diameter of the core 25 is slightly greater than the external diameter of the extension 12 so that there is an air space or slot 28 between the core and the extension, which means that, while the heat may be radiated from the core to the extension, there is no direct heat conductive relation therebetween, except through the body portion, the purpose of which will be explained hereinafter more in detail.

Quite obviously, the heating element may be connected up in any suitable manner to a source of current. By way of example, one end of the heating coil is connected by a wire 30 to one of the usual terminal posts 31, and the other end of the coil is connected to the other post 31 by a wire 32 in which is interposed the protective device, as hereinafter described more in detail. The wire 32 may extend through an insulating tube 33 to the upper end of the coil, as shown most clearly in Figs. 1 and 3.

The protective device may be of any suitable or approved type, but, by way of example, we have shown, in the drawings, a protective device similar to that disclosed in the United States Patent No. 1,060,266, granted April 29, 1913, to Landers, Frary & Clark, as the assignee of the said Joseph F. Lamb. This protective device includes a pair of spaced contacts 35 carried by, but insulated from, a plate 36 which, together with a plate 37 of insulating material, is secured to the lower end of the skirt 15 by means of screws 38. The insulating member 37 may be of asbestos or the like and serves to hold the unit in place and to prevent heat radiation from the lower end of the core. The contacts 35 are interposed in the wire 32 and their ends project into the tubular post or extension 12. If desired, the openings through which the contacts extend may be lined with insulators 39. The protective device has a connector or tube 40 of lead or other material readily fusible at a relatively low temperature, and a holder or screw 41 screwed into the lower end of the extension 12. The connector is insulated from the screw 41 by a lining 42. If desired, a contact plate 43 may be interposed between the connector and the terminals, and this plate may be urged against the end of the connector by a spring 44. The terminals or contacts 35 may be backed by a disk 46 seated on an internal shoulder in the bore 13, this disk being insulated from the terminals by sheets of mica 47.

It will be observed, from the foregoing description taken in connection with the accompanying drawings, that our improved heater is of relatively small cross section and of long slender shape so that it may be readily accommodated in percolators or the like having small slender and graceful waist-like portions. In utensils of this sort, considerable difficulty has been experienced in providing a heating unit suitably protected so that the current will not be prematurely broken while, at the same time, in the event that the fluid being heated should become dangerously low, the current through the heating element would be broken just before, and at a slightly higher temperature than that at which, damage may result to the utensil. More particularly, it has been found that devices heretofore on the market were not entirely reliable, it being obvious that greatest care must be taken to prevent the percolator from overheating to such an extent that the solder which joins the base and vessel together becomes melted. With our improved heater, it has been found that the current through the heating unit is positively broken with great nicety at a definite selected temperature so that all likelihood of damage to the vessel, due to overheating, is effectively guarded against.

Experience has shown that, with the arrangement described, the protective device may be set to operate to break the circuit at a temperature which is only very slightly less than that at which the solder $c$ will melt and that the action of this protective device is positive so that, when the water has become almost depleted, and not until then, will the current on the vessel be automatically thrown off. These results are due to the peculiar construction and arrangement of parts. It will be seen that the electric heating unit is in more direct heat conductive relation to the vaporizing chamber 11 than to the protective device.

During the normal operation of the device, the heat will be conducted from the heating element through the skirt to walls of the well or vaporizing chamber from which the heat will be drawn by the fluid to be heated. Some of the heat will flow through the annular flange 18, the bottom of the vessel and the nut 21, so that the water will be preliminarily heated before it reaches the vaporizing chamber. As long as there is sufficient fluid in the vessel, the heat imparted to the metal of the heating unit will be carried off at such a rate that the protective device is not affected. As soon, however, as the water in the vessel becomes almost depleted, the heat will flow down the extension 12 and heat the connector or tube 40 to the melting point, whereupon the current is broken before injury can result to the utensil or any of the parts. It will be understood that the air space between the core 25 and the extension prevents direct conduction of the heat therebetween, which means that the conductivity of heat from the unit to the plug is less than the heat conductivity from the unit to the water in the vaporizing chamber.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A heater of the character described including a part having a body portion provided at one end with a portion from which the heat is adapted to be drawn and at its other end with a depending extension, said part also having a depending hollow cylindrical skirt surrounding said depending extension, a cylindrical heating unit within and in direct heat conductive relation to said skirt, a narrow space being provided between said unit and said depending extension, and a protective device in the lower end of said depending extension for breaking the current through said heating unit when a dangerous temperature is reached.

2. A heater of the character described having a part with a body portion provided with an upwardly extending projection, a depending extension, a depending cylindrical skirt surrounding said depending extension and a well constituting a vaporizing chamber extending through said projection and down into said body portion and substantially to the top of said depending extension; a cylindrical heating unit within said skirt in direct heat conductive relation thereto and spaced slightly from said depending extension; and a protective device located in the lower end of said depending extension for breaking the current through said heating unit when a dangerous temperature is reached.

3. A heater of the character described including a part having a body portion, an upwardly extending projection, a depending extension in vertical alinement with said projection, a depending cylindrical skirt surrounding and spaced from said depending extension and a well constituting a vaporizing chamber extending through said projection and down into said body portion; a cylindrical heating unit within said skirt and in direct heat conductive relation thereto and comprising a cylindrical member of insulating material and a resistance wire wound thereabout, said unit surrounding said depending extension and being slightly spaced therefrom, and a protective device at the lower end of said depending extension for breaking the current through said resistance wire when a dangerous degree of heat is reached.

4. A heater of the character described having a part with a body portion provided with an upwardly extending projection, a depending extension, a depending cylindrical skirt surrounding said depending extension, and a a well constituting a vaporizing chamber extending through said projection and down into said body portion, the upper face of said body portion being adapted to engage the bottom of the receptacle and said face having an annular groove; a cylindrical heating unit within said skirt in direct heat conductive relation thereto and spaced slightly from said depending extension; and a protective device located in the lower end of said depending extension for breaking the current through said heating unit when a dangerous temperature is reached.

5. A heater of the character described including a part having a body portion, an upwardly extending projection, a depending extension, a depending cylindrical skirt surrounding and spaced from said depending extension and a well constituting a vaporizing chamber extending through said projection and down into said body portion; a cylindrical heating unit within said skirt and in direct heat conductive relation thereto and comprising a cylindrical member of insulating material, and a resistance wire wound thereabout; the lower end of said extension depending below said skirt and unit and said unit surrounding the depending extension and being slightly spaced therefrom; and a protective device in the lower end of said extension for breaking the current through said resistance wire when a dangerous degree of heat is reached.

6. A heater of the character described including a part having a body portion, an upwardly extending projection, a depending cylindrical skirt, a depending tubular extention located centrally of said skirt and projecting below the lower end thereof, and a well constituting a vaporizing chamber in said projection and body portion; a cylindrical heating unit within said skirt and in direct heat conductive relation thereto and comprising a cylindrical member of insulating material and a resistance wire wound thereabout, said unit surrounding said depending extension and being slightly spaced therefrom; a member of heat insulating and electrical insulating characteristics connected to the lower end of said skirt and having an opening through which said depending extension projects; and a protective device in the lower end of said extension for breaking the current through said resistance wire when a dangerous degree of heat is reached.

7. A heater of the character described including a part having a body portion, an upwardly extending projection, a depending extension in vertical alinement with said projection, a depending cylindrical skirt surrounding and spaced from said depending extension and a well constituting a vaporizing chamber extending through said projection and down into said body portion; a cylindrical heating unit within said skirt and in direct heat conductive relation thereto and comprising a cylindrical member of insulating material and a resistance wire wound thereabout, said unit surrounding said depending extension and being slight spaced therefrom, and a protective device at the lower end of said depending extension for breaking the current through said resistance wire when a dangerous degree of heat is reached, the bottom of said well being adjacent the top of said extension whereby the path of heat from said resistance wire through said skirt to said well is relatively shorter than to said protective device.

JOSEPH F. LAMB.
JOSEPH FREDERICK SMART.